(12) United States Patent
Gamble et al.

(10) Patent No.: US 7,558,360 B1
(45) Date of Patent: Jul. 7, 2009

(54) CORE CATCHER COOLING

(75) Inventors: Robert Edward Gamble, Los Altos, CA (US); Momtaz Mahdi Aburomia, Palo Alto, CA (US); Perng-Fei Gou, Saratoga, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/749,869

(22) Filed: Dec. 31, 2003

(51) Int. Cl.
*G21C 9/00* (2006.01)

(52) U.S. Cl. ................. 376/280; 376/283; 376/277; 376/282

(58) Field of Classification Search ................. 376/280, 376/283, 277, 282
See application file for complete search history.

(56) References Cited

U.S. PATENT DOCUMENTS

| | | | |
|---|---|---|---|
| 3,930,939 A | 1/1976 | Bittermann et al. | |
| 4,113,560 A | 9/1978 | Driscoll et al. | |
| 4,240,875 A | 12/1980 | Katscher | |
| 4,442,065 A * | 4/1984 | Latter et al. | 376/280 |
| 4,464,333 A * | 8/1984 | Wohlsen | 376/280 |
| 5,057,271 A | 10/1991 | Turricchia | |
| 5,263,066 A * | 11/1993 | Szabo et al. | 376/280 |
| 5,307,390 A | 4/1994 | Gou et al. | |
| 5,315,625 A * | 5/1994 | Turricchia | 376/280 |
| 5,343,506 A * | 8/1994 | Artnik et al. | 376/280 |
| 5,347,556 A | 9/1994 | McDonald et al. | |
| 5,349,615 A * | 9/1994 | Ferroni | 376/280 |
| 5,659,589 A * | 8/1997 | Wistuba et al. | 376/280 |
| 5,699,394 A * | 12/1997 | Schreiber et al. | 376/289 |
| 5,889,830 A * | 3/1999 | Hollmann | 376/280 |
| 5,907,588 A * | 5/1999 | Fischer et al. | 376/280 |
| 6,285,727 B1 | 9/2001 | Bredolt et al. | |
| 6,353,651 B1 | 3/2002 | Gou et al. | |

FOREIGN PATENT DOCUMENTS

EP 0 965135 B1 8/2002

OTHER PUBLICATIONS

Merriam-Webster's Collegiate Dictionary, Tenth Edition, p. 328.*
Merriam-Webster's Collegiate Dictionary, Tenth Edition, p. 86.*

* cited by examiner

*Primary Examiner*—Rick Palabrica
(74) *Attorney, Agent, or Firm*—Armstrong Teasdale LLP

(57) ABSTRACT

An assembly includes a base grid configured to be disposed below a pressure vessel and spaced vertically above a floor of a containment vessel to define a sump therebetween. The assembly further includes an annular wall extending vertically upwards from the floor and laterally bounding the base grid and the sump. The wall separates the sump from a suppression pool, an inlet passage extending through the wall and providing flow communication between the sump and the suppression pool, and an outlet passage extending through the wall and providing flow communication between the sump and the suppression pool.

17 Claims, 3 Drawing Sheets

CORE CATCHER COOLING

BACKGROUND OF THE INVENTION

This invention relates generally to nuclear reactors and more particularly to a heat removal system in a containment.

One known boiling water nuclear reactor includes a reactor pressure vessel (RPV) positioned in a drywell, or containment, suppression pool (SP) and a passive containment cooling system (PCCS). The RPV contains a core, and the containment is designed to withstand design pressure defined by a loss of coolant accident (LOCA) and other loads associated with plant operation. The PCCS is configured to limit the containment pressure below the design value and to keep the RPV core substantially cool during a postulated loss of coolant accident.

Typically the bottom floor of the containment vessel is part of the basemat of the reactor building. The basemat, in certain situations, rests on bedrock and typically supports the reactor building, containment vessel wall, suppression pool and reactor pedestal that supports the RPV including the internal components of the reactor. In the event of a severe accident in which the molten core is postulated to penetrate the lower head of the reactor, the molten core would flow into the region below the reactor pressure vessel and contacts the floor of the containment vessel that is lined with a stainless steel liner. There are several known methods of protecting the containment liner and basemat structure from the molten core debris. However, some methods do not include long-term stabilization by cooling the molten core debris.

BRIEF SUMMARY OF THE INVENTION

In one aspect, an assembly is provided that includes a base grid configured to be disposed below a pressure vessel and spaced vertically above a floor of a containment vessel to define a sump therebetween. The assembly further includes an annular wall extending vertically upwards from the floor and laterally bounding the base grid and the sump, the wall separates the sump from a suppression pool, at least one flow baffle extending into the sump from the wall, an inlet passage extending through the wall, the inlet passage providing flow communication between the sump and the suppression pool, and an outlet passage extending through the wall, the outlet passage providing flow communication between the sump and the suppression pool.

In another aspect, an assembly is provided that includes a containment vessel, the containment vessel having a drywell and a floor, a reactor pressure vessel installed inside the containment vessel, a base grid disposed below the pressure vessel and spaced vertically above the floor of the containment vessel to define a sump therebetween, at least one flow baffle in the sump; an annular wall extending vertically upward from the base grid, the wall spaced inwardly from a sidewall of the containment vessel to define an annular channel therebetween, an inlet flow channel extending through the channel providing flow communication between the drywell and the sump, and an outlet flow channel extending through the channel providing flow communication between the sump and the drywell.

In another aspect, a nuclear reactor is provided that includes a primary containment including a floor, a reactor pressure vessel located in the primary containment, a drywell located in the primary containment and disposed above the reactor pressure vessel, a suppression pool located in the primary containment and disposed adjacent to the reactor pressure vessel, and a core cooling system located in the primary containment and disposed below the reactor pressure vessel. The core cooling system including a base grid having a top plate and a bottom plate, the base grid is spaced vertically above the floor of the containment vessel to define a sump therebetween, a substantially sinuous flow path defined in the sump, an inlet passage providing flow communication between the sump and at least one of the drywell and the suppression pool, and an outlet passage providing flow communication between the sump and at least one of the drywell and the suppression pool, the inlet and outlet passages configured to circulate water between the sump and at least one of the drywell and the suppression pool through convection.

DETAILED DESCRIPTION OF THE INVENTION

Figure 1:
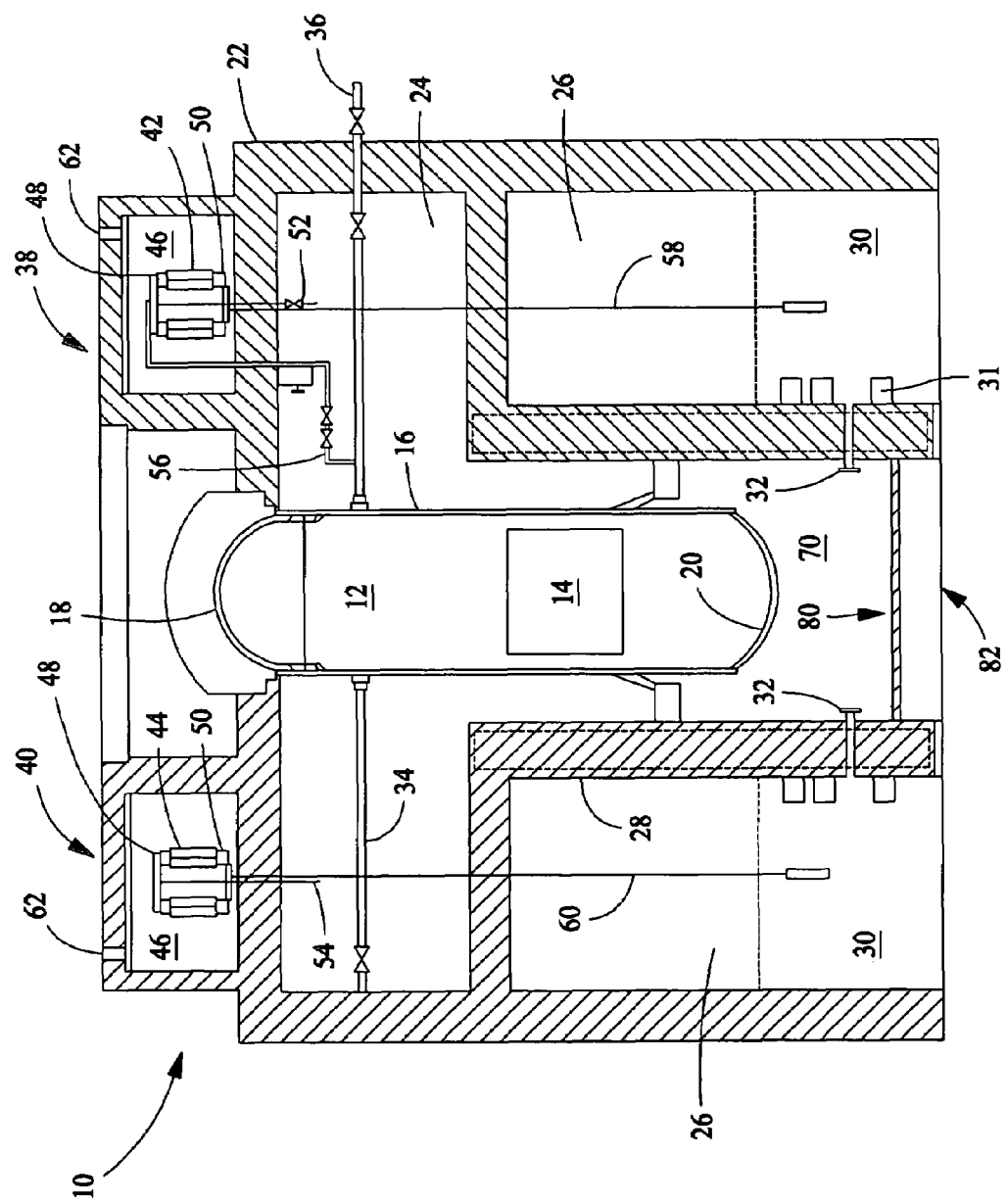
FIG. 1 is a schematic of a nuclear reactor system in accordance with an embodiment of the present invention.

FIG. 1 is a schematic depiction of a nuclear reactor system 10 in accordance with one embodiment of the present invention. Nuclear reactor system 10 includes a cylindrical reactor pressure vessel 12 (RPV) which encloses a reactor core 14. RPV 12 includes a cylindrical wall 16 sealed at one end by a top head 18 and at the other end by a bottom head 20. RPV 12 is housed in a primary containment vessel 22 (PCV). The inside surface of the primary containment vessel 22 is lined with a steel liner. Primary containment vessel 22 includes a drywell 24 and a wetwell 26. In one embodiment, drywell 24 is a concrete cylinder with a domed top, and wetwell 26 is an annular chamber formed by a RPV pedestal or wall 28 and primary containment vessel 22. A suppression pool of water 30 is located in wetwell 26, and RPV 12 is located in drywell 24. Connection between drywell 24 and wetwell 26 is provided by the drywell/wetwell vent system embedded within wall 28. During a severe accident, additional connection is activated between the lower drywell and the suppression pool 30 through a plurality of fusible valves 32 in the lower part of drywell wall 28. Downcomers or tubular channels (not shown) extend vertically within wall 28. One end of each downcomer is open to drywell 24 and the other end is coupled to horizontal nozzles 31 which are immersed in water of suppression pool 30. Drywell wall 28 extends vertically from a basemat 82 of PCV 22 and separates drywell 24 from suppression pool 30. In one embodiment, drywell wall 28 is annular. Valves 32 are fusible, and remain closed until the temperature in drywell 24 exceeds a predetermined temperature. At the predetermined temperature, valves 32 open to permit water to flow from suppression pool 30 into drywell 24. Additionally, a feedwater line 34 supplies water to RPV 12, and a steam line 36 carries steam away from RPV 12.

Also shown in FIG. 1 are two primary containment cooling systems 38 and 40, sometimes referred to herein as PCCS 38 and 40. PCCS 38 and 40 include condensers, or heat exchangers, 42 and 44 that condense steam and transfer heat to water in a large condenser pool 46 which is vented to the atmosphere. Each condenser 42 and 44 is submerged in a respective compartment of condenser pool 46 located high in the reactor building at approximately the same elevation as the fuel pools. Condenser pool 46 is above and outside of PCV 22. In one embodiment, nuclear reactor system 10 does not include PCCS 38.

Each condenser 42 and 44 is coupled to an upper drum 48 and a lower drum 50. Steam enters PCCS 38 and 40 through lines, or flowpaths, 52 and 54 respectively. A steam-gas mixture may also enter PCCS 38 through line, or flowpath, 56 from RPV 12. The steam is condensed in condensers 42 and 44 and falls to lower drum 50. From lower drum 50, the steam condensate and the noncondensable gases can be drained and vented through lines 58 and 60 having outlets which are submerged in suppression pool 30.

Heat from PCCS 38 and 40 causes condenser pool 46 temperature to rise to a point where the condenser pool water will boil. The steam which is formed, being nonradioactive and having a slight positive pressure relative to station ambient pressure, is vented from the steam space above each PCCS 38 and 40 to outside the reactor building via discharge vents 62. A moisture separator may be installed at the entrance to discharge vents 62 to preclude excessive moisture carryover and loss of condenser pool water.

In the event of a severe accident, the reactor core 14 may become overheated and the nuclear fuel therein, which includes uranium, may melt to form a liquid molten mass referred to herein as corium 70. Corium 70 will melt its way through bottom head 20 of pressure vessel 12 and drop to a corium protection assembly. In order to protect PCV 22 from the corium 70 and contain it therein, a corium protection assembly or core catcher 80 in accordance with one embodiment of the present invention is provided. Core catcher 80 is positioned proximate a basemat 82 of PCV 22 in a lower region of drywell 24.

Figure 2:
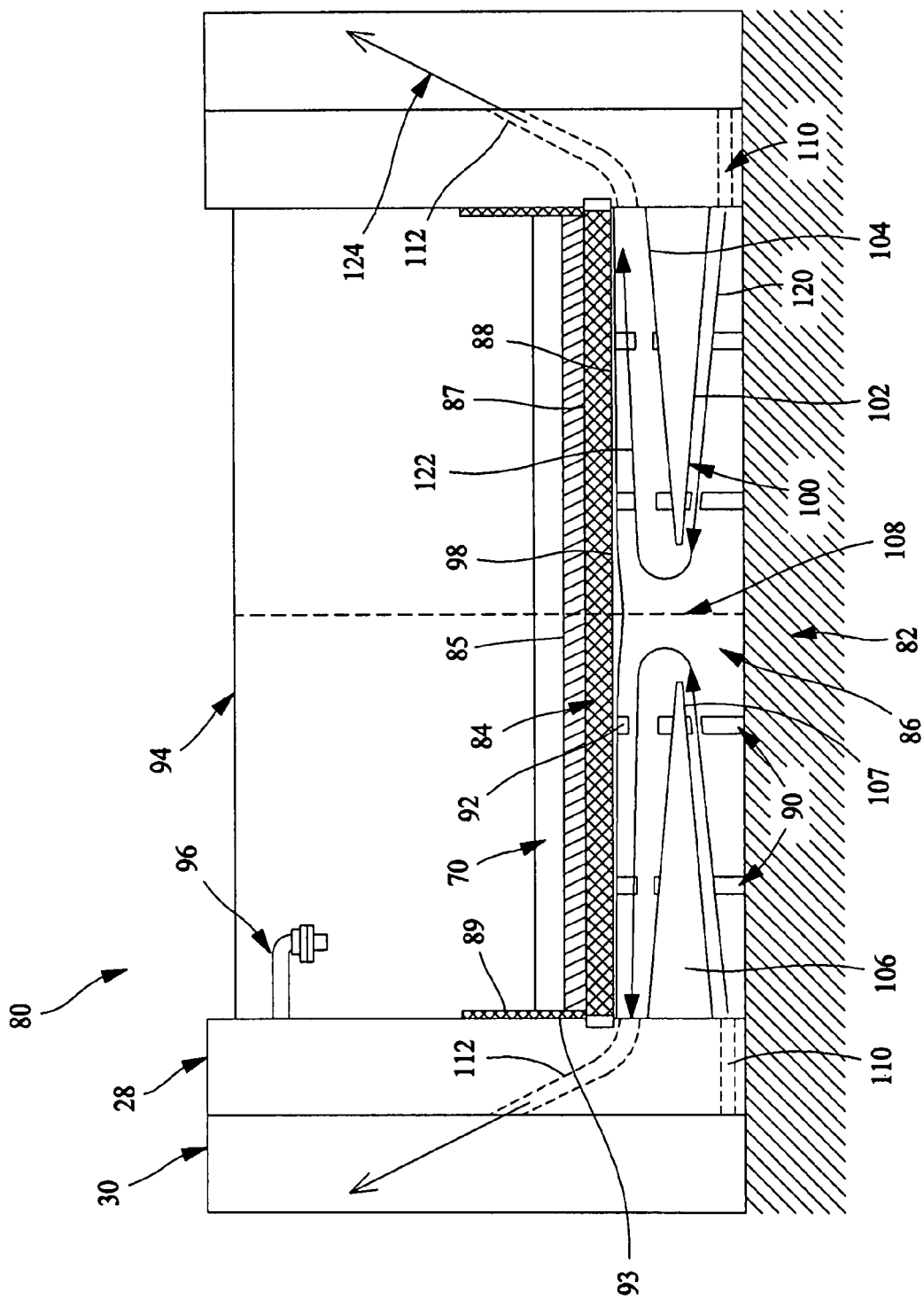
FIG. 2 is a schematic side view of one embodiment of a core catcher region of the nuclear reactor system, with direct interface to the suppression pool shown in FIG. 1.

FIG. 2 is a schematic side view of one embodiment of core catcher 80. Core catcher 80 includes a base grid 84 disposed below the pressure vessel 12 and spaced vertically above basemat 82 of PCV 22 to define a gap or sump 86 therebetween. Drywell wall 28 lateral bounds base grid 84 and sump 86.

Base grid 84 has a top plate 87 and a bottom plate 88. Base grid 84 has base grid shield walls 89 extending vertically from top plate 87 of base grid 84. In one embodiment, a plurality of columns 90 support a web of I-beams 92 on which is mounted base grid 84. The web defines openings between I-beams 92 facilitating fluid flow under base grid 84. In one embodiment, a plurality of layers of laterally adjoining protective blocks (not shown) are disposed on top plate 87 of base grid 84 and are sized and configured for protecting PCV 22 from corium 70. In another embodiment, base grid 84 includes a supported structure (not shown) made of a steel layer, which is covered on top plate 87 with a refractory material 85 and cooled by water 94. Water 94 may be provided by flooding the lower drywell 24 through a conduit 96 using either active (pumps) or passive (gravity) means. In another embodiment, bottom plate 88 and the side surface of cylindrical wall 89 are covered with insulation material 98 (or ceramic material) to prevent degradation of strength of core catcher 80 due to high temperatures from corium 70. Insulation material (or ceramic material) protects core catcher 80 to maintain its structural integrity such that corium 70 can be retained in core catcher 80 and cooled.

Core catcher 80 includes at least one flow baffle 100 disposed in sump 86. In one embodiment, flow baffle 100 extends from wall 28. Flow baffle 100 has a base end 106 and a tip end 107, whereby base end 106 has a larger cross-sectional area than tip end 107. Flow baffle 100 has a flow inlet side 102 and a flow outlet side 104. In one embodiment, flow baffles 100 are configured to extend around existing I-beams 92 such that I-beams 92 are not changed to accommodate flow baffles 100. In a further embodiment, flow baffle 100 is annular and extends from wall 28 to define a flow baffle opening 108.

As shown in FIG. 2, wall 28 includes an inlet flow passage 110 and an outlet flow passage 112 extending therethrough. Both inlet and outlet flow passages 110 and 112 provide flow communication between suppression pool 30 and sump 86. In one embodiment, inlet flow passage 110 is substantially parallel to basemat 82 and outlet flow passage 112 is angled upward from sump 86 to suppression pool 30. Inlet flow passage 110 is positioned in wall 28 to discharge water from suppression pool 30 into sump 86 proximate to flow inlet side 102 of flow baffle 100.

Sump 86 is continually maintained to have a sufficient level of water to accomplish the objectives described herein. In the event of a core melt, water from a lower region (cooler water) of suppression pool 30 is drawn through inlet flow passage 110 to sump 86. Water enters sump 86 in a first flow path 120 and travels along flow inlet side 102 of flow baffle 100. As the water is heated by corium 70, the heated water/steam mixture exits sump 86 and travels in a second flow path 122 along flow outlet side 104 of flow baffle 100 by the process of natural convection. The heated water/steam mixture exits sump 86 through outlet flow passage 112 and is discharged, as indicated by arrow 124, to an upper region of suppression pool 30. Thus a substantially sinuous path of travel is provided to promote circulation of the cooling water. In one embodiment, base grid 84 of core catcher 80 is cone shaped to enhance flow along bottom plate 88. Alternatively, a small conical addition is coupled at the center of bottom plate 88 of base grid 84 to enhance the heat transfer near the center of base grid 84 (due to minimizing the stagnation point effects). In a further embodiment, base grid 84 has a generally convex shape to enhance flow along bottom plate 88. In addition, I-beams 92 may be perforated to enhance cooling water flow below base grid 84.

Figure 3:
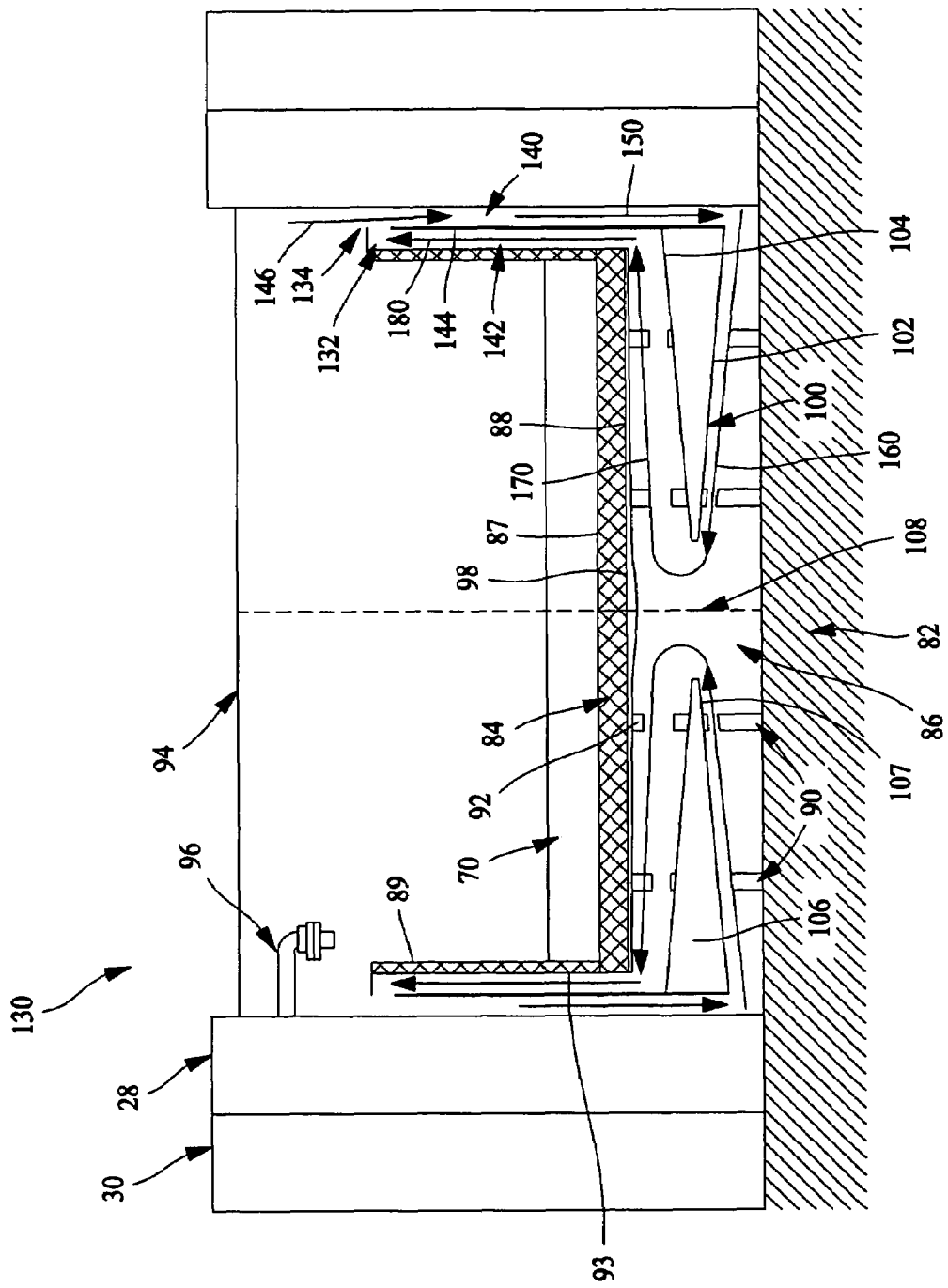
FIG. 3 is a schematic side view of another embodiment of a core catcher region of the nuclear reactor system, with direct interface with the water inventory in the drywell, but without any direct communication with the suppression pool shown in FIG. 1.

FIG. 3 is a schematic side view of another embodiment of a core catcher 130. Components in core catcher 130 that are identical to components in core catcher 80 described above with regard to FIG. 2 are identified in FIG. 3 using the same reference numerals used in FIG. 2. Sump 86 could be either dry or filled with water during normal operations. If sump 86 were not filled during normal operation it could be filled during an accident through flooding the lower region of drywell 24. Shield walls 89 are spaced inwardly from wall 28 to define an annular channel 132 therebetween. Annular channel 132 has a flow opening 134 and includes an inlet flow channel 140 and an outlet flow channel 142 extending therethrough. In one embodiment, inlet and outlet flow channels 140 and 142 are annular and a partition 144 extends from flow outlet side 104 of flow baffle 100. Partition 144 extends into channel 132 and divides channel 132 into inlet flow channel 140 and outlet flow channel 142. In another embodiment, inlet flow channel 140 and outlet flow channel 142 extend substantially perpendicular to basemat 82 and are substantially parallel to each other.

In the event of a core melt, water 94 from drywell 24 is circulated into flow opening 134, as indicated by arrow 146, and through inlet flow channel 140 in a first flow path 150. Water 94 travels in a second flow path 160 along flow inlet side 102 of flow baffle 100. As water 94 is heated by corium 70, the heated water/steam mixture travels in a third flow path 170 along flow outlet side 104 of flow baffle 100 by the process of natural convection. The heated water/steam mixture exits sump 86 in a fourth flow path 180 through outlet flow channel 104. The heated water/steam mixture is discharged through flow opening 134 and returned to drywell 24. Thus a substantially sinuous path of travel is provided to promote circulation of the cooling water. In the embodiments shown in FIGS. 2 and 3, the circulating water keeps the bottom and sides of core catcher 80 sufficiently cool to avoid melt through by corium 70.

Core catchers 80 and 130 utilize passive designs to retain and cool the core melt masses within containment boundary under severe accident conditions. Core catchers 80 and 130 provide simultaneous bottom and top cooling of corium 70 through the optimization of the internal design of core catchers 80 and 130 which eliminates the interaction of corium 70 with the containment basemat 82 and walls 28 of PCV 22.

The above-described core catcher retains and cools the corium, inhibits corium-concrete interaction and thereby minimizes the resulting pressure in the containment during a severe accident without damage to containment structures.

While the invention has been described and illustrated in terms of various specific embodiments, those skilled in the art will recognize that the invention can be practiced with modification within the spirit and scope of the claims.

What is claimed is:

1. An assembly comprising:
   a containment vessel comprising a suppression pool, a drywell and a floor, said drywell comprising a sidewall extending upward from said floor, said sidewall separating said suppression pool from said drywell, said suppression pool, said drywell, and said drywell sidewall located inside said containment vessel;
   a reactor pressure vessel installed inside said containment vessel;
   a base grid disposed underneath said pressure vessel and spaced vertically above said floor of said containment vessel to define a sump therebetween, said drywell sidewall bounding said sump, wherein a vertical axis of said reactor pressure vessel intersects said base grid, said base grid comprising a top plate;
   a layer of refractory material disposed on top of said top plate;
   an annular base grid shield wall extending vertically upward from said base grid, said base grid shield wall having a configuration comprising at least one of:
      (a) said base grid shield wall spaced inwardly from said drywell sidewall to define an annular channel therebetween; and
      (b) said base grid shield wall positioned adjacent said drywell sidewall;
   at least one flow baffle in said sump, said at least one flow baffle comprising a base end and a tip end, said base end having a larger cross-sectional area than said tip end, said base end positioned proximate said drywell side wall;
   an inlet flow channel extending through at least one of said annular channel providing flow communication between said drywell and said sump, and an inlet flow passage through said drywell sidewall providing flow communication between said sump and said suppression pool; and
   an outlet flow channel extending through at least one of said annular channel providing flow communication between said sump and said drywell, and an outlet flow passage through said drywell sidewall providing flow communication between said sump and said suppression pool.

2. The assembly according to claim 1 wherein a substantially sinuous flow path is defined in said sump.

3. The assembly according to claim 1 wherein said at least one flow baffle includes a flow inlet side and a flow outlet side.

4. The assembly according to claim 1 wherein said flow baffle has a partition extending upwardly therefrom and into said annular channel, said partition dividing said inlet flow channel from said outlet flow channel.

5. The assembly according to claim 1 wherein said inlet and outlet flow channels extend substantially parallel to each other.

6. The assembly according to claim 1 wherein said outlet flow channel provides flow communication for water from said sump to said drywell by convection.

7. The assembly according to claim 1 wherein said inlet passage is substantially parallel to the floor.

8. The assembly according to claim 1 wherein said outlet passage extends upwardly from said sump to the suppression pool.

9. The assembly according to claim 3 wherein said outlet passage is positioned above said flow outlet side of said flow baffle.

10. The assembly according to claim 3 wherein said inlet passage is positioned to discharge water from the suppression pool into said sump proximate said flow inlet side of said flow baffle.

11. The assembly according to claim 3 wherein said inlet flow channel provides flow communication for water from said drywell to said flow inlet side of said at least one flow baffle.

12. A nuclear reactor comprising:
   a primary containment comprising a floor;
   a reactor pressure vessel located in said primary containment;
   a drywell located in said primary containment, said drywell comprising a sidewall;
   a suppression pool located in said primary containment, said suppression pool separated from said drywell by said drywell sidewall; and
   a core catcher cooling system located in said primary containment and disposed underneath said reactor pressure vessel, said core catcher cooling system comprising:
      a base grid having a top plate and a bottom plate, said base grid disposed underneath said reactor pressure vessel, and spaced vertically above said floor of said containment vessel to define a sump therebetween, said drywell sidewall bounding said sump, wherein a vertical axis of said reactor pressure vessel intersects said base grid;
      a layer of refractory material disposed on top of said top plate;
      an annular base grid shield wall extending vertically upward from said base grid, said base grid shield wall having a configuration comprising at least one of:
         (a) said base grid shield wall spaced inwardly from said drywell sidewall to define an annular channel therebetween; and
         (b) said base grid shield wall positioned adjacent said drywell sidewall;
      at least one flow baffle in said sump, said at least one flow baffle comprising a base end and a tip end, said base end having a larger cross-sectional area than said tip end, said base end positioned proximate said drywell side wall;
      an inlet passage providing flow communication between said sump and at least one of said drywell and said suppression pool, said inlet flow channel extending through at least one of said annular channel and said drywell sidewall; and an outlet passage providing flow communication between said sump and at least one of said drywell and said suppression pool, said outlet passage extending through at least one of said annular channel and said drywell sidewall, said inlet and outlet passages configured to circulate water between said sump and at least one of said drywell and said suppression pool by convection.

13. The nuclear reactor according to claim 12 further comprising a substantially sinuous flow path defined in said sump.

14. The nuclear reactor according to claim 12 further comprising a cone coupled to said bottom plate.

15. The nuclear reactor according to claim 12 wherein said at least one flow baffle includes a flow inlet side and a flow outlet side.

16. The nuclear reactor according to claim 12 wherein said flow baffle has a partition extending upwardly therefrom and into said annular channel, said partition dividing said inlet flow channel from said outlet flow channel.

17. The nuclear reactor according to claim 12 wherein said inlet and outlet flow passages extend substantially parallel to each other.

* * * * *